US005292033A

United States Patent [19]

Gueret

[11] Patent Number: 5,292,033

[45] Date of Patent: Mar. 8, 1994

[54] DISPENSER FOR A LIQUID TO PASTY PRODUCT AND SUBPLATE FOR A DISPENSER OF THIS KIND

[75] Inventor: Jean-Louis H. Gueret, Paris, France

[73] Assignee: L'Oreal, Paris, France

[21] Appl. No.: 46,381

[22] Filed: Apr. 9, 1993

Related U.S. Application Data

[63] Continuation of Ser. No. 792,661, Nov. 15, 1991, abandoned.

[30] Foreign Application Priority Data

Nov. 16, 1990 [FR] France ................................ 90 14271

[51] Int. Cl.[5] ............................................ G01F 11/04

[52] U.S. Cl. ...................................... 222/95; 222/105; 222/328; 222/321

[58] Field of Search ................. 222/95, 105, 328, 383, 222/385, 321

[56] References Cited

U.S. PATENT DOCUMENTS

| | | | |
|---|---|---|---|
| 1,679,305 | 7/1928 | Heller | 222/382 |
| 2,818,201 | 12/1957 | Peck | 222/383 X |
| 3,331,559 | 7/1967 | Fedit | 222/321 X |
| 3,361,078 | 1/1968 | Cooprider | 222/383 X |
| 3,420,413 | 1/1969 | Corsette | 222/107 |
| 3,486,661 | 12/1969 | Friedrich et al. | 222/95 |
| 4,008,830 | 2/1977 | Meshberg | 222/95 |
| 4,193,551 | 3/1980 | Saito et al. | 222/321 X |
| 4,434,916 | 3/1984 | Ruscitti et al. | 222/385 X |
| 4,844,299 | 7/1989 | Sekiguchi et al. | 222/95 X |
| 4,946,076 | 8/1990 | Hackmann et al. | 222/385 X |
| 5,031,384 | 7/1991 | Rebeyrolle et al. | 222/95 X |

FOREIGN PATENT DOCUMENTS

| | | | |
|---|---|---|---|
| 330530 | 8/1986 | European Pat. Off. | 222/321 |
| 0282595 | 9/1988 | European Pat. Off. . | |
| 0309949 | 4/1989 | European Pat. Off. . | |
| 0340724 | 11/1989 | European Pat. Off. . | |
| 2800176 | 7/1978 | Fed. Rep. of Germany | 222/321 |
| 2906308 | 8/1980 | Fed. Rep. of Germany . | |
| 2512517 | 3/1983 | France . | |

*Primary Examiner*—Andres Kashnikow
*Assistant Examiner*—Kenneth Bomberg
*Attorney, Agent, or Firm*—Cushman, Darby & Cushman

[57] ABSTRACT

The dispenser for a liquid to pasty product comprises a container (R) containing the product (P) integral with a rigid outer casing (4) provided in its upper part with a subplate (7) to which there is fixed a hand pump (8) surmounted by a push-button (9). The subplate (7) is in the form of a dish engaged in the container (R) and with its concavity directed towards the face opposite the container. The pump (8) is carried by the base (11) of the dish. The depth (h) of the dish is substantially equal to the length (1) of the pump body. The base (11) of the dish is provided with a movable transition component (13) connected to the base so that it projects in relation thereto, the pump body being engaged in the said component and fixed to the transition component (13) at or below the upper level of the subplate.

7 Claims, 4 Drawing Sheets

DISPENSER FOR A LIQUID TO PASTY PRODUCT AND SUBPLATE FOR A DISPENSER OF THIS KIND

This is a continuation of application Ser. No. 07/792,661, filed on Nov. 15, 1991, abandoned.

BACKGROUND OF THE INVENTION

1. Field of the Invention

The invention relates to a dispenser for a liquid to pasty product, of the type comprising a container containing the product, integral with a rigid outer casing provided in its upper part with a subplate to which there is fixed a hand pump surmounted by a push-button.

2. Description of the Prior Art

Hand pumps are generally crimped on to a neck disposed in the upper part of the subplate forming the top of the container. Each pump is usually provided with a metal crimp cap which is itself fixed to the pump by crimping. In order to fix the metal crimp cap to the neck carried by the subplate, a free space is required to effect crimping.

Consequently, the crimp cap is situated substantially higher than the upper part of the subplate, this being disagreeable from an aesthetic point of view as the pump is itself surmounted by the push-button, so that the assembly forms an upper projection perched above the upper level of the subplate.

Moreover, the greater the volume dispensed upon each actuation of the pump, the greater the operating stroke of the pump. Consequently, in the case of pumps intended to dispense large doses, the push-button will be perched even higher above the crimp cap to allow for a large stroke. As the container is picked up at the casing, the finger of the user intended to press the top of the push-button may not be long enough to allow for comfortable operation of the dispenser.

In order to obviate this problem, it is proposed in EP-A 0 282 595 and EP-A 0 340 724 to provide the product dispenser with a dished subplate engaged in the container, the pump being fixed to the base of said dish so that the pump can be disposed in part below the upper level of the container. In these two documents, the pump is fixed directly to the base of the dish. Under these conditions, it is often difficult to mount the pump on the subplate, as this is done at the base of a dish and there is not enough space for the introduction of the various tools required.

SUMMARY OF THE INVENTION

This invention obviates these disadvantages by fixing the pump first to a transition component or intermediate sleeve outside the subplate and then fixing the assembly consisting of the pump and the transition component to the base of the subplate, the transition component being a component not forming part of the pump.

Therefore, this invention relates to a dispenser for a liquid to pasty product comprising a container containing the product, integral with a rigid outer casing provided in its upper part with a subplate, to which there is fixed a hand pump consisting of a fixed pump body and a movable part associated with a push-button, the subplate being in the form of a dish engaged in the container and with its concavity directed towards the side opposite the container and the pump being carried by the base of the dish, characterised in that the depth of the dish is substantially equal to the length of the pump body, that the base of the dish is provided with a movable transition component connected to the base so that it projects in relation thereto, the pump body being engaged in the said component, and that the pump body is fixed to the transition component substantially at or below the upper level of the subplate.

As a result of the fact that the pump is fixed to a transition component serving as a means for fixing the pump, the pump body can be fixed in a simple manner at the edge of the dish, and even below the latter.

In addition, by virture of the transition component, the pump can in a way be adapted to the subplate and, consequently, pumps of different sizes can be used on one subplate, or subplates of different shapes can be used for one pump size. Only the shape and/or the dimensions of the transition component have to be modified.

Moreover, by virtue of the transition component, the container can be filled completely from the top without an air pocket forming at the top of the container, said air pocket having the disadvantage of preventing priming of the pumps without air recirculation, as it is possible to fill the container via the opening formed in the subplate for the passage of the pump body, and when the assembly consisting of the transition component and the pump is introduced the air can escape until the transition component is fixed to the subplate.

Moreover, by virtue of the use of the movable transition component, it is possible to prepare refills formed by the container and the subplate to which the transition component containing the pump and the push-button is fixed at the time of use.

The sleeve may be connected to the base of the dish, in particular by means of snap engagement to its base, in a sheath provided in the central zone of the base of the dish.

The pump may be clipped or preferably crimped on to the transition component. In the case of a standard pump provided with a metal crimp cap, the free edge of which is folded down, the transition component is cylindrical having a circular section and comprises in its upper part a collar for crimping of the cap. In the case of a standard pump, the free edge of which is raised, the transition component comprises in its upper part a radial transverse annular wall provided on its outer periphery with an upwardly directed cylindrical edge parallel to the axis of the sleeve for crimping of the cap.

The inner face of the pump body is preferably adjacent to the inner face of the base of the subplate.

The container may consist of a deformable flexible pouch, and the rigid casing is separate from the container, an air inlet being provided in the said casing.

According to another possibility, the wall of the container is rigid and forms the said rigid outer casing, the container comprising in its interior a follower subjected to atmospheric pressure on its face opposite the product.

The subplate may be formed in one piece with the container, while the base of this container is connected to the said container, in particular by snap engagement or screwing.

If the container consists of a flexible pouch, the base of the dish advantageously comprises at least one anti-trapping means extending within the container. The anti-trapping means may be locked to or may form an integral part of the base of the dish, especially being moulded in one piece with this base. This anti-trapping means may consist of a perforated tube or a set of several fins distributed around the axis of the container, the edge of each fin adjacent to the axis comprising a recess so as to leave a passage for the product in the central zone included between the fins.

Other anti-trapping means that can be used within the scope of this invention are described in French Patent Application No. 90 02500 filed on Feb. 28, 1990.

When the anti-trapping means consists of a perforated tube, the latter may be formed in one piece with the transition component, which extends into the container.

The pump used is selected according to the desired flow rate. The pump can be selected from the group of pumps comprising a piston, membrane or valve system.

The transverse section of the subplate may have a shape other than circular, especially an oval or tray shape.

When the assembly consisting of the container and the subplate forms a refill to which an assembly consisting of a pump and a recoverable sleeve is subsequently fixed, the subplate is closed during storage, preferably with the aid of a cover. According to a first embodiment, this cover comprises zones of smaller thickness and can be torn by the end of the pump body when it is fixed to the subplate. According to a second embodiment, the lower edge of the pump body carries cutters for cutting the cover. The cover may be glued to or moulded in one piece with the subplate.

According to one particular embodiment, a receptacle containing an additive is disposed in the interior of the transition component, this receptacle comprising openings so that when the product to be dispensed contained in the container is dispensed, the product to be dispensed pushes the additive out through the openings of the said receptacle, the additive coming into contact with the product contained in the pouch.

The invention also relates to a subplate for a dispenser for a liquid to pasty product, to which there is fixed a hand pump consisting of a fixed pump body and a movable part associated with a push-button, the subplate being in the form of a dish engaged in the container and with its concavity directed towards the side opposite the container and the pump being carried by the base of the dish, characterised in that the depth of the dish is substantially equal to the length of the pump body, that the base of the dish is provided with a movable transition component connected to the said base so that it projects in relation thereto, the pump body being engaged in the said component, and that the pump body is fixed to the transition component at a level situated below the upper lever of the subplate.

In addition to the arrangements described hereinabove, the invention consists of a number of other arrangements which will be described in more detail hereinafter by way of non-limiting embodiments described with reference to the accompanying drawings, in which:

DETAILED DESCRIPTION OF THE INVENTION

Figure 1:
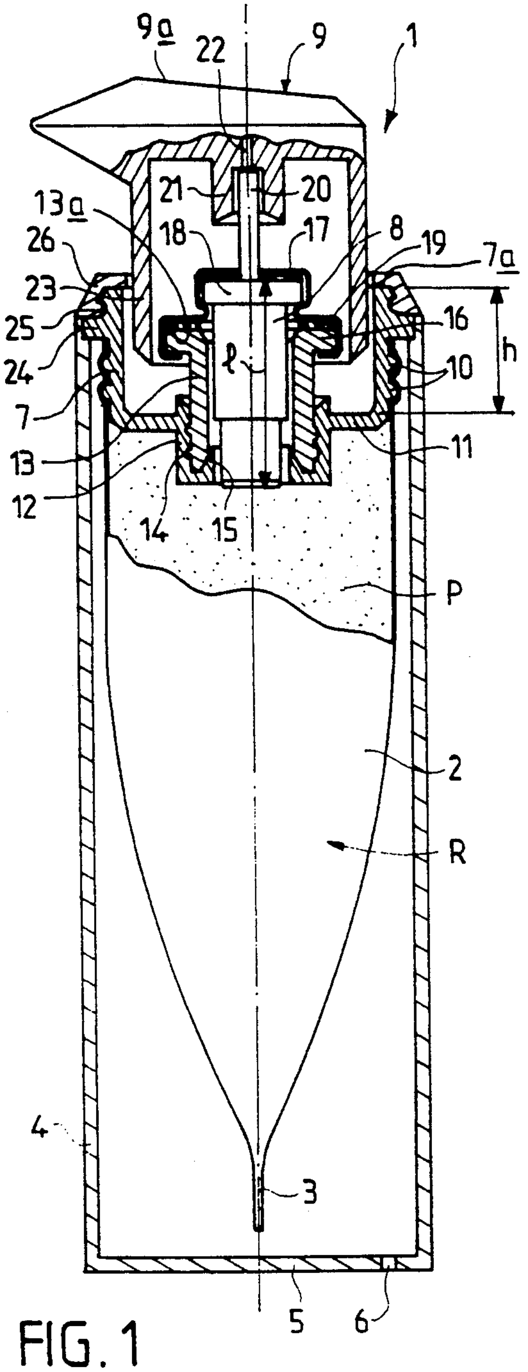
FIG. 1 is a vertical axial section, with portions on the outside, of a product dispenser according to the invention, the product container of which consists of a deformable flexible pouch.

Referring to FIG. 1 of these drawings, it shows a dispenser 1 for a liquid to pasty product P, comprising a container R consisting of a deformable flexible pouch 2 which is closed in its lower part 3, e.g. by a double seam. The pouch 2 is made integral in its upper part, by means of a subplate 7, with a rigid outer casing 4 of cylindrical shape, the transverse section of which may have a shape other than circular, e.g. an oval shape. The casing 4 is provided with a base 5 comprising an orifice 6 to establish communication with the atmosphere. A hand pump 8 without air recirculation and surmounted by a push-button 9 is fixed to the subplate 7.

The subplate 7 is in the form of a dish engaged in the container R. More precisely, the dish 7 is provided on its outer wall with beading 10 engaged by the upper part of the pouch 2 which is fixed to the wall of the subplate by any appropriate means, especially by welding. The subplate 7 has its concavity directed towards the side opposite the pouch 2.

The pump 8, only the outer part of which forming the body can be seen, is carried by the base 11 of the dish so that the push-button 9 and its upper surface 9*a* are relatively close to the upper level of the pouch 2.

A sheath 12 is provided in the central zone of the base 11 of the dish. This sheath 12 projects principally from the side of the base 11 directed towards the pouch 2 and slightly into the concavity of the dish. A transition component or sleeve 13 is locked at its base into the sheath 12, e.g. by cooperation of two sets of peripheral annular beading 14, spaced axially from one another and provided on the sleeve, with mating annular grooves provided on the inner face of the sheath 12. This sheath is provided in its lower part with a collar 15 projecting axially towards the interior of the sheath and having a truncated outer surface, forming a sealing lip capable of cooperating with the mating end of the inner face of the sleeve 13. By virtue of the lip 15, it is possible to establish a seal with the sleeves 13, the inner diameter of which may vary, so that pumps 8 of different diameters can be fixed to one subplate 7 with an adapted sleeve.

The intermediate sleeve 13 comprises in its upper part a radially projecting collar 16 for the crimping of a metal cap 17 provided on the pump 8. The pump body comprises in its upper part a collar 18 of larger diameter on to which the upper part of the cap 17 is crimped, this cap having a free edge folded down and adapted to be crimped on to the collar 16. A sealing washer 19, e.g. of elastomeric material, is provided between the upper face of the collar 16 and the zone opposite the cap 17.

Another sealing washer is provided between the collar 18 and the upper part of the cap 17.

A tube 20 projects towards the top relative to the pump body 8.

The push-button 9 comprises in its interior a boss 21 provided with a bore adapted to receive the end of the tube 20, a duct 22 being provided in the push-button 9 to establish a connection with the atmosphere. The tube 20 may be inserted in the pump body and may actuate a piston (not shown) when pressure is exerted on the push-button 9, return being ensured by a spring (not shown in the drawing) disposed in the interior of the pump body.

A sufficient radial space is provided between the inner face of the subplate 7 and the periphery of the collar 16 to allow for the passage of a skirt 23 of the push-button 9.

Towards its upper end, the subplate 7 is provided with an outer peripheral rib 24 provided with a snap groove capable of cooperating with a corresponding snap means provided at the upper end of the casing 4. The rib 24 is surmounted by a snap groove 25, provided on the periphery of the subplate 7 in order to receive snap beading of a lid 26 provided in its central region with an opening for the passage and guiding of the skirt 23.

In the drawings, h designates the depth of the dish formed by the subplate 7 and 1 designates the axial length of the pump body 8, this length 1 not taking account of the tube 20. It would appear that the pump 8, and consequently the push-button 9, is lowered relative to the upper end of the casing 4 by a distance at least equal to h so that the aesthetic effect is improved and operation of the pump is facilitated, even when the stroke of the pump is large. In the event of a change in the dimensions of the transverse section of the container R, or in its cross-sectional shape, only the subplate 7 has to be changed and the casing 4 can be retained.

The upper edge 13*a* of the sleeve 13 is situated at a level below or equal to that of the upper edge 7*a* of the subplate 7. The fixing of the pump to the sleeve 13, especially by crimping, is marked in this manner in the interior of the dish.

If the type of pump 8 is changed, it is possible to keep the same subplate 7 for one type of container R, possibly changing only the intermediate sleeve 13. The flexible pouch 2 can be crushed down to the lower level 11 of the dished subplate 7 so that the product loss after use of the pouch 2 is reduced.

It is clear that the pump can be positioned anywhere in the subplate 7, i.e. the axis of the pump does not necessarily coincide with the axis of the dish.

Figure 2:
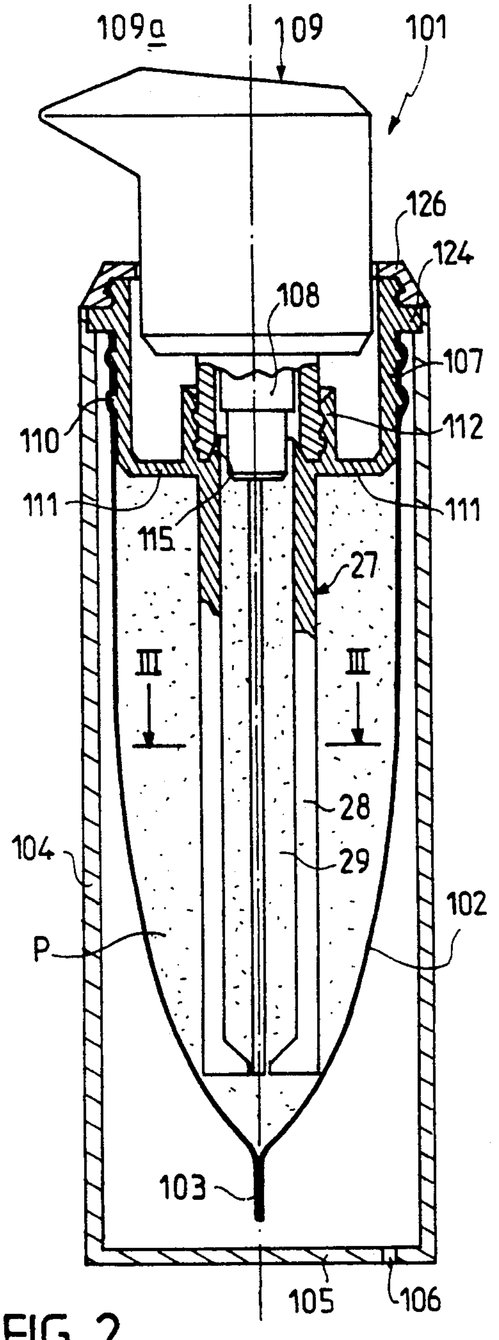
FIG. 2 is a section similar to FIG. 1 of a variant embodiment comprising an anti-trapping system in the interior of the flexible pouch.
Figure 3:
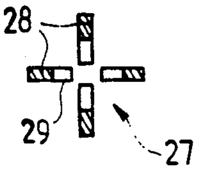
FIG. 3 is a section along the line III—III of FIG. 2.

Referring to FIG. 2, it shows a variant embodiment of the device of FIG. 1, in which those elements identical or similar to those already described with reference to FIG. 1 have been designated by the same reference numerals, possibly increased by the number 100, and they are not described again or are described only briefly. The same thing shall apply to the other variant embodiments, the reference numerals being increased by 100 each time.

The base 111 of the dish 107 carries anti-trapping means 27, the function of which, known per se, is to prevent the walls of the flexible pouch 102 from sticking to one another, e.g. in their central zone, and trapping a mass of product which will not be expelled in the lower part.

The anti-trapping means 27 advantageously consist of four fins 28 arranged in a cross around the axis of the container and extending longitudinally downwards from the opening in which the base of the pump body 108 is engaged. The edge of each fin adjacent to the axis comprises a recess 29 so as to leave a passage for the product in the central zone included between the fins.

The fins 28 are advantageously moulded in one piece with the dish 107, and the sheath 112 is situated completely within the concavity of the dish 107.

Of course it is possible to provide any anti-trapping device moulded in one piece with the base 111 of the dish, e.g. a grill or a perforated tube.

A perforated tube of this kind could be formed in one piece with the intermediate sleeve 113.

Figures 4, 5, 6:
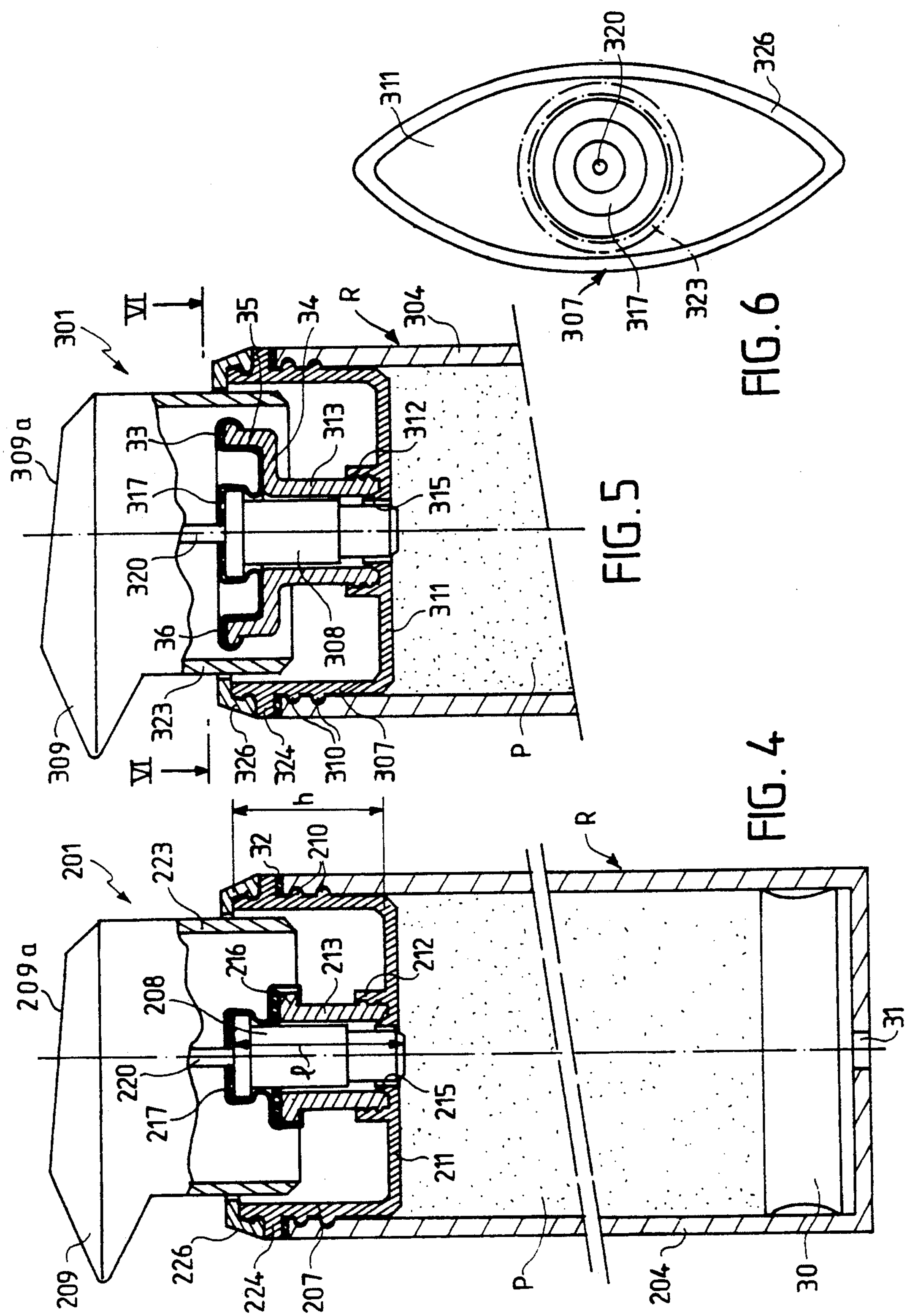
FIG. 4 is a vertical axial section of another embodiment of a product dispenser according to the invention, having a container with a rigid wall.
FIG. 5 is a variant embodiment of the device of FIG. 4.
FIG. 6 is a view along the line VI—VI of FIG. 5, on a smaller scale, of the subplate of the device provided with the hand pump.

Referring now to FIG. 4, it shows a variant embodiment in which the wall of the container R is rigid and simultaneously forms the rigid outer casing 204.

The container R comprises in the interior of the wall 204 a follower 30, the face of which opposite the product is subjected to atmospheric pressure by virtue of the presence of a hole 31 provided in the base 205 of the container R.

The dished subplate 207 is locked to the upper end of the container R with the lid of beading 210 received by mating grooves provided on the inner face of the wall 204. The rib 224 covers the upper end of the wall 204, with the interposition of a sealing washer 32.

The sheath 212 is situated completely within the concavity of the dish 207 and the lower end of the pump body 208 is virtually flush with the inner face of the base 211 so that when the piston 30 comes to rest against this end of the pump body, there is virtually no product left in the container R.

The depth h of the dish 207 is substantially equal to the length l of the pump body 208.

In FIG. 4, the subplate 207 is shown as a separate component from the container R. As a variant, this subplate could be made, especially moulded, in one piece with the container R, while the base 205 would be connected to the container, in particular by snap engagement or screwing. FIG. 5 shows a variant embodiment of the device of FIG. 4.

In the device of FIG. 5, the metal cap 317 for crimping of the pump comprises a free raised edge 33, the opposite to the case of FIG. 4. The intermediate sleeve 313 comprises in its upper part a radial transverse annular wall 34 provided on its outer periphery with an upwardly directed cylindrical edge 35 parallel to the axis of the sleeve. This edge 35 comprises at its upper end outer beading for crimping of the edge 33 of the metal cap, with the interposition of a sealing washer 36.

FIG. 6 shows that the subplate 307 has an oval cross-section, in the shape of a tray, the casing 304 admitting of a similar transverse section in which the said subplate is engaged.

Figure 7:
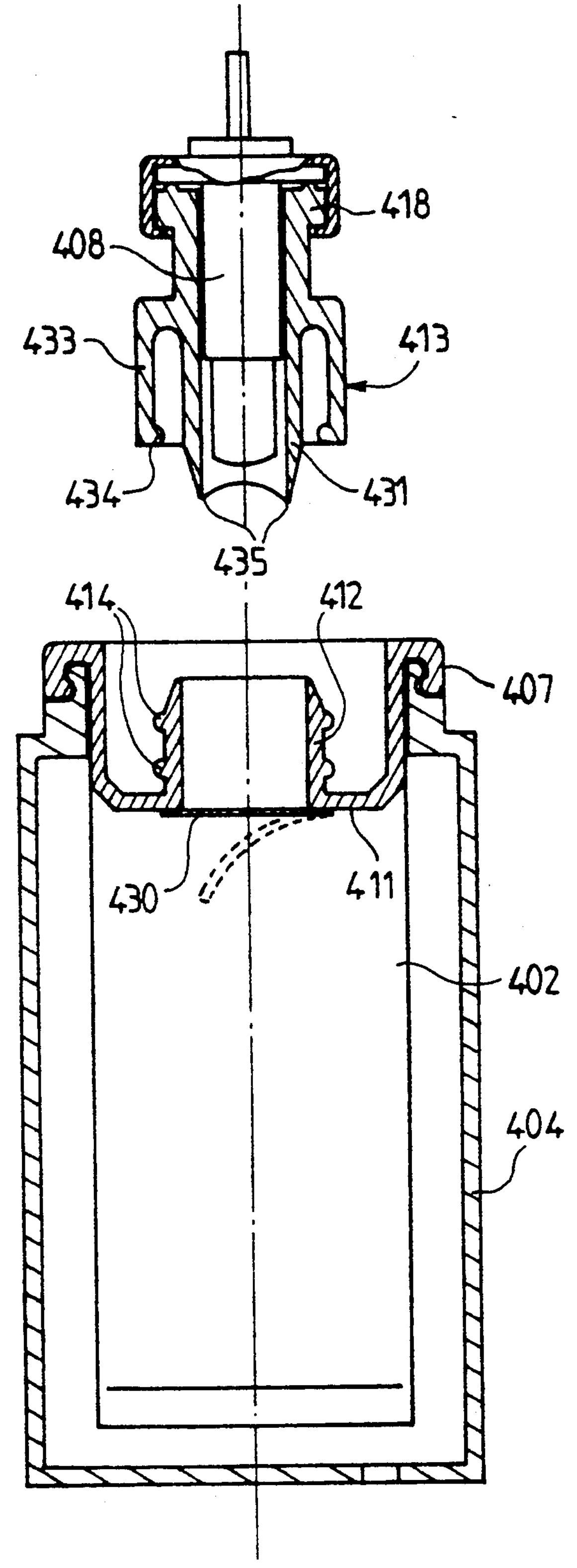
FIG. 7 is a vertical axial section of a refill formed by a container/subplate assembly closed by a cover and a pump/sleeve assembly before fixing to the refill.

In the embodiment illustrated in FIG. 7, the device consists of an assembly consisting of a flexible pouch 402 and a subplate 407, in which the flexible pouch is fixed by welding to the subplate 407. The assembly consisting of the flexible pouch 402 and the subplate 407 forms a refill and is movably fixed to a rigid enclosure 404 as explained with reference to FIG. 1. An assembly consisting of a pump 408 and a transition component 413 can be fixed to the subplate 407. The subplate 407 is provided with an axial sheath 412 provided with outer annular snap beading 414 for fixing the intermediate component 413 by snap engagement. The axial opening formed by the sheath 412 is closed by a heat sealed cover of aluminium 430, the cover being fixed to the surface of the base 411 of the subplate directed towards the container. The transition component 413 is formed by a cylindrical part 431 having an outer diameter equal, except for the necessary clearance, to the inner diameter of the sheath. A sealing skirt 433 is disposed on the outer face of the sleeve 413 by means of an annular surface perpendicular to the axis of the sleeve, the lower rim of said skirt being provided with snap beading 434 capable of cooperating with the snap beading 414 of the sheath 412. Cutters 435 are disposed on the lower edge of the cylindrical part 431 of the sleeve 413.

The pump 408 is analogous to the one illustrated in FIG. 1 and it is fixed by crimping to upper beading 418 on the transition component 413.

When the user wishes to use a refill, he introduces the transition component 413 into the rigid container and/or fixes it by snap engagement to the sheath 412, the cylindrical part 431 carrying the cutters 435 penetrating into the sheath 412 and the sealing skirt 433 being fixed by snap engagement to the outer face of the sheath 412. The cutters 435 situated in the lower part of the cylindrical part 431 of the transition component 413 tear the cover 430 and establish communication between the pouch 402 and the pump 408. The user can then fix the push-button (not shown) to the pump 408.

Figure 8:
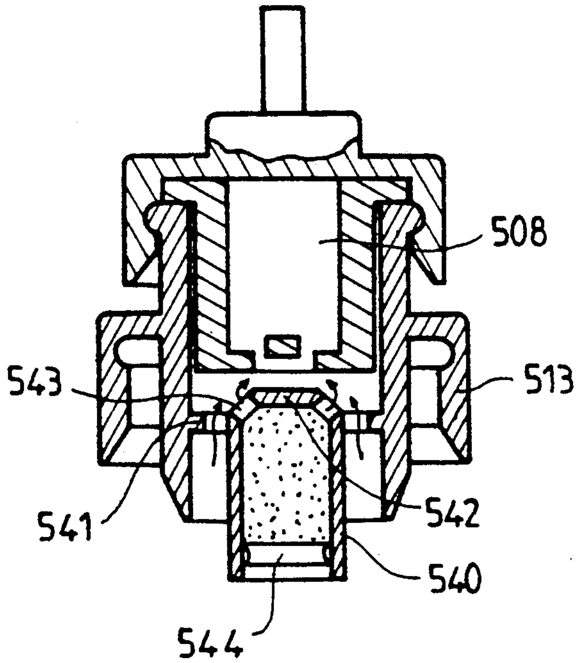
FIG. 8 is a vertical axial section of an assembly consisting of the pump and the transition component, comprising a receptacle for an additive.

The assembly consisting of the pump 508 and the transition component 513 illustrated in FIG. 8 comprises a receptacle 540 fixed by lugs 541 to the lateral wall of the transition component 513 so that its upper face 542 is disposed below the pump body. Openings 543 are formed on the periphery of the upper face 541. The base of the receptacle is provided with a follower 544.

The receptacle contains an additive A. When the assembly consisting of the pump 508 and the transition component 513 is fixed to the subplate and the pump is actuated, the product contained in the pouch pushes the follower 544, resulting in delivery of the additive through the openings 543. The additive A then comes into contact with a flow of the product to be dispensed passing around the receptacle 540.

I claim:

1. A dispenser for a liquid or pasty product comprising a container containing the product, said container having an end connected with a rigid outer casing, said rigid outer casing having an upper part and a subplate connected to said upper part, said subplate supporting a hand pump with said hand pump having a fixed pump body and a movable part associated with a push button, said subplate being in the form of dish having a concave portion with said concave portion facing in a direction away from said container, said dish having a base and said pump body being supported on said base, wherein said dish has an upper edge and the depth of said dish is substantially equal to the length of the pump body and said base of said dish is provided with a separable transition component connected to said base to project in relation thereto away from said container, said pump body being engaged in said transition component so as to extend to but not beyond the level of said upper edge; said hand pump being crimped onto said transition component, said transition component being cylindrical in shape and having a circular section and comprising an upper part having a collar for receiving the crimp of a cap, said push button including a skirt having a lower edge, said collar being spaced a selected radial distance from said upper edge of said dish so as to permit said skirt of said push button to pass between said collar and said upper edge sufficiently far to allow said push button to effect dispensing.

2. The invention as claimed in claim 1, wherein said transition component is connected to said base of said subplate by means of a sheath provided in a central region of said base of said subplate.

3. The invention as claimed in claim 2, wherein said transition component is fixed by a snap engagement to said base.

4. The invention as claimed in claim 1, wherein said container for said product comprises a deformable, flexible pouch and said rigid casing is separate from said container and includes an air passage.

5. The invention as claimed in claim 1, wherein said subplate comprises at least one anti-trapping means.

6. Dispenser according to claim 5, characterised in that the anti-trapping means comprises a set of several fins (28) distributed around the axis of the container and forming an integral part of the base of the subplate, the edge of each fin adjacent to the axis comprising a recess (29) so as to leave a passage for the product in the central zone included between the fins.

7. The invention as claimed in claim 1, wherein said pump body has an inner portion and said base of said dish has an inner face; said inner portion of said pump body being adjacent said inner face of said base of said dish.

* * * * *